United States Patent [19]

Burge et al.

[11] 4,228,198
[45] Oct. 14, 1980

[54] SWEETENING COMPOSITIONS CONTAINING ARABINOGALACTAN

[75] Inventors: Malcolm L. E. Burge, Thatcham; Zdenek L. A. Z. Nechutny, Reading, both of England

[73] Assignee: Tate & Lyle Limited, London, England

[21] Appl. No.: 909,834

[22] Filed: May 26, 1978

Related U.S. Application Data

[63] Continuation-in-part of Ser. No. 700,310, Jun. 28, 1976, abandoned.

[30] Foreign Application Priority Data

Jul. 4, 1975 [GB] United Kingdom ............... 28217/75
Jul. 4, 1975 [GB] United Kingdom ............... 28232/75

[51] Int. Cl.$^2$ ............................................. A23L 1/236
[52] U.S. Cl. ................................... 426/548; 426/656; 426/658; 426/804
[58] Field of Search ............... 426/548, 656, 658, 804

[56] References Cited

U.S. PATENT DOCUMENTS

| | | | |
|---|---|---|---|
| 3,294,544 | 12/1966 | Stanko | 426/590 |
| 3,667,969 | 6/1972 | Kracauer | 426/548 |
| 3,704,138 | 11/1972 | La Via et al. | 426/548 |
| 3,780,190 | 12/1973 | Kracauer | 426/548 |
| 3,878,184 | 4/1975 | Dobry | 426/548 X |
| 3,886,295 | 5/1975 | Burke et al. | 426/804 X |

*Primary Examiner*—Esther M. Kepplinger
*Attorney, Agent, or Firm*—Ostrolenk, Faber, Gerb & Soffen

[57] ABSTRACT

A sweetening composition containing at least one sweetener selected from a protein sweetener and saccharin, together with arabinogalactan, the ratio by weight of arabinogalactan to saccharin not exceeding 1:1 when saccharin is used as the only sweetener possesses enhanced sweetening properties as compared with a composition containing no sweetness modifier; the sweetness profile is more rounded and unpleasant after-tastes are minimized.

22 Claims, No Drawings

SWEETENING COMPOSITIONS CONTAINING ARABINOGALACTAN

This is a continuation-in-part of application Ser. No. 700,310, filed June 28, 1976 now abandoned.

The present invention relates to compositions which are useful as sweeteners for edible materials.

Although sucrose is still the most widely used sweetening agent, synthetic sweeteners have become increasingly important in recent years.

Saccharin is an example of a commonly used synthetic sweetener. The term saccharin as used herein is defined to mean saccharin itself and its salts and includes, for example, sodium saccharin, calcium saccharin, potassium saccharin, ammonium saccharin and magnesium saccharin. Saccharin is used widely as a substitute for sugar, but has the disadvantage of having a bitter and metallic after-taste to which, it has been reported, from one quarter to one third of the population is sensitive.

In the past, many additives have been proposed for saccharin compositions in order to eliminate or reduce the after-taste but none has proved really successful or popular. Examples of proposed additives include glucono-delta-lactone, calcium gluconate, lactose, ribonucleotides, piperazine, pectin, mannitol, maltol, adipic acid, galactose and sodium chloride.

The need thus remains for a modified saccharin composition in which the unpleasant after-taste has been substantially reduced or, ideally, eliminated completely.

Cyclamates e.g. cylcamic acid or its salts such as sodium cyclamate have also been proposed for use in sweetening compositions both as an alternative to saccharin and in admixture with saccharin. However they, too, suffer from an unpleasant after-taste.

Naturally occurring protein sweeteners are now of considerable interest. For example, a sweet principle (known as thaumatin) occurs in the fruit of the tropical plant *Thaumatococcus daniellii* Benth. of the family Marantaceae which grows in various parts of tropical Africa. The plant is called Katemfe in Sierra Leone. The fruit is tetrahedral, approximately 4 cm diameter and contains up to three large black seeds each having a white or light yellow aril at its apex and surrounded by a transparent jelly. The arils are intensely sweet. Thaumatin can be extracted by the procedures described by van der Wel and Loeve, Eur. J. Biochem., 31 221–5, (1972). A particularly advantageous process using an aluminum salt solution as extractant is described in our copending cognate British Application No. 17831/75 and 5719/76.

Another sweet principle (known as monellin) is found in the fruit of the tropical plant *Dioscoreophyllum cumminsii* Diels. of the family Menispermaceae. The plant and berries have become known as Guinea Potato or Serendipity Berry. The plant is native to the forests of tropical West Africa and bears grape-like clusters of red berries about ½ inch in diameter. The berries have a tough outer skin enclosing a white sweet-tasting mucilaginous material surrounding the seed. The sweet principle can be extracted from the mucilaginous material using the procedure described, for example, in the papers of J. A. Morris et al. J Biol. Chem. 248 (2), 534–9 (1973) or by van der Wel, F.E.B.S. Letters 21 (1), 88–90 (1973).

Thaumatin and monellin are many times sweeter than sucrose, but have the disadvantage of a delay in perception of the sweet taste, a persistent lingering sweet taste and a slight after-taste often described as licorice-like.

We have now found, surprisingly, that a naturally occurring polysaccharide gum having in itself no sweet taste, when incorporated in compositions containing a protein sweetener such as thaumatin or monellin, or saccharin or a cyclamate, or mixtures thereof, enhances the overall sweetness of the composition and reduces or eliminates the after-taste, which is often considered unpleasant.

According to the present invention, we provide a sweetening composition containing at least one sweetener selected from a protein sweetener and saccharin, together with arabinogalactan, the ratio by weight of arabinogalactan to saccharin not exceeding 1:1 when saccharin is used as the only sweetener. The protein sweetener is preferably thaumatin or monellin.

Arabinogalactan, otherwise known as larch gum, is a naturally occurring polysaccharide obtained from larch trees, although other sources have been reported in the literature. It is a polysaccharide containing monomers of galactose and arabinose and has been reported to be non-digestible by man. In view of this non-digestibility, its actual, as opposed to theoretical, calorific value is virtually zero, since it is egested in an unmetabolised state. This property makes arabinogalactan particularly desirable in low-calorie sweetening agents. It is a recognised food additive in several countries, including U.S.A., where it is used as an emulsifier or in a variety of food applications. It has been also proposed as a "bodying" agent for use in low calorie sweeteners.

The sweetness-modifying property of arabinogalactan is particularly surprising in view of the fact that we have found that several other polysaccharides have no detectable activity.

Arabinogalactan has physical and organoleptic properties which makes it suitable for inclusion in sweetening compositions. It has no noticeable sweetness itself and thus does not itself add sweetness to the composition. Its inclusion in a sweetening composition does not increase the effective calorific value per unit sweetness of the composition, and thus compositions of the invention are suitable for incorporation into dietetic and diabetic foods.

The ratio by weight of arabinogalactan to protein sweetener may conveniently be stated with reference to the relative sweetness of the protein sweetener as compared with sucrose. Different protein sweeteners have different degrees of sweetness, and different extracts of the same protein sweetener may also have different degrees of sweetness.

When the sweetener used is a protein sweetener in the absence of saccharin, the ratio of arabinogalactan to protein sweetener is desirably from x:12 to x:70, preferably about x:32, where x is the number of times sweeter the protein sweetener is as compared with sucrose at a concentration of 5% by weight as described below.

Thus, the ratio of arabinogalactan to thaumatin preferably lies within the range from 290:1 to 50:1, advantageously about 110:1 when the thaumatin sweetness is approximately 3,500 times that of sucrose; while the ratio by weight of modifier to monellin preferably lies within the range from 67:1 to 11:1, advantageously about 25:1, when the monellin sweetness is approximately 800 times that of sucrose when estimated against a 5% sucrose solution.

When the sweetener used is saccharin alone, the preferred weight ratio of arabinogalactan to saccharin ranges from 1:5 to 1:1. A ratio above 1:1 is undesirable since at these levels the taste modifier significantly reduces the sweetness, even though the after-taste is still reduced. At ratios below 1:5, the reduction of the after-taste is less than is generally required. A particularly advantageous ratio is about 1:3.

In contrast, when arabinogalactan has been proposed as a "bodying" agent for use with saccharin, the amount of arabinogalactan used as compared with saccharin, is very high. Typically the ratio of arabinogalactan to saccharin would be about 100:1. At these levels, arabinogalactan provides a bulking action and also improves the "mouth feel". There has been no report of any modification of the saccharin sweetness or after-taste at these levels.

At levels of arabinogalactan according to the present invention, the bulking effect of arabinogalactan and the modification of the mouth feel are insignificant. Thus, for example, at concentrations of 1% or less, the arabinogalactan provides no recognisable "body" or "mouth feel" properties whatsoever. As will be shown later these properties first become noticeable between 2.5 and 3.0%.

A protein sweetener, especially thaumatin, may be used as a sweetener in its own right in many food or pharmaceutical compositions where a novel sweet sensation and a lingering sweetness is desirable.

For many potential uses, it is, however, desirable to provide a sweet sensation as similar as possible to that of sucrose. However, the lingering sweetness of the protein sweeteners is much too extended to accomplish this objective. As an example, the sweetness of a thaumatin solution equivalent to a 6.2% sucrose solution persists for 19 minutes; when arabinogalactan is added to the extent of about 0.2% or greater, this time is reduced to about one minute or less. If an immediate sweetness impact is required the sweetener must usually therefore be used in combination with an alternative sweetener such as sugar and/or an artificial sweetener such as saccharin or a cyclamate.

It is well known that the practical sweetening power of some alternative sweeteners varies when used in combinations with sugar or other sweeteners in different proportions. The sweetness of saccharin, for example, varies in different sugar/saccharin combinations. Similarly, the practical sweetening power of thaumatin varies with the ratio of thaumatin to sugar or saccharin (or alternative sweetener). The most effective combinations have approximately half the sweetness contribution from thaumatin (or monellin) and half from sugar or saccharin or a cyclamate.

Sweetener combinations containing thaumatin or monellin in conjunction with saccharin are particularly advantageous as the bitter after-taste of saccharin is minimised by the developing sweetness of the protein.

The effect of arabinogalactan in such sweetener combinations is to minimise the sweetness duration and the after-taste, to give a more "rounded" sweetness profile to combinations or thaumatin with alternative sweeteners, and to enhance the overall sweetness of the sweetener combination alone.

In compositions in which the protein sweetener and saccharin each contribute about half the total sweetness, arabinogalactan is preferably used at a level intermediate between the levels used when either sweetener is used alone. The use of thaumatin and monellin in combination with saccharin itself is described in our copending Application Ser. No. 702,199 filed June 28, 1976, now U.S. Pat. No. 4,122,205.

Alternatively, we have found that the addition of arabinogalactan means that it is possible to partly or completely replace saccharin in the composition by a natural sweetener such as sugar. It is thus possible to produce a completely saccharin-free sweetening composition of acceptable organoleptic properties.

We have also found that the use of arabinogalactan together with a further sweetness modifier selected from xylitol, D-arabitol, D-galactose, L-gulose, D-fucose, lactulose, glucoheptose and D(+)-galactosamine produces a synergistic effect, thus enabling a smaller overall amount of sweetness modifier to be included in the composition. The use of thaumatin or monellin with these modifying agents is described and claimed in our said copending application Ser. No. 702,199.

Thus, according to this invention we also provide sweetening compositions as defined above containing arabinogalactan, together with any of the sweetness modifiers mentioned in the preceding paragraph.

The compositions of the invention are soluble in water, and can be used to sweeten edible material in general, including all kinds of foodstuffs, beverages and pharmaceutical preparations. They may be incorporated into, for example, soft drinks, candies, juices, syrups, squashes, sauces, condiments, salad dressings, frozen desserts such as ice creams and sherberts, icings, gelatin, toothpaste, mouthwashes or chewing gum. For ease of addition and in order to achieve homogeneous distribution at the desired dilution in edible material, the compositions of the invention may be formulated in the conventional manner with solid or liquid non-toxic carriers or diluents. For example, solid compositions may take the form of tablets or powders using edible solid carriers such as malto-dextrin, starch or nutritive proteins (e.g. soy protein); or the composition of the invention may be mixed with sucrose to provide a "fortified" sugar. Liquid compositions may take the form of aqueous solutions or of suspensions in other non-toxic liquids such as aqueous ethanol, glycerol and edible oils, and may be used, for example, for spraying.

For use in domestic applications, praticularly as a replacement for sugar in beverage sweetening, it is desirable that the compositions according to the present invention include a bulking agent so that an equivalent sweetness to that provided by, say, a teaspoonful of sugar is provided by an amount which can conveniently be handled. Any suitable soluble and edible material can be used, for example, a carbohydrate such as sucrose itself, especially transformed sugar of low density, dextrose or sorbitol or a dextrin such as spray-dried malto-dextrin. While the substances will add significantly to the calorific value of the composition, the total will still be considerably smaller than that of the amount of sugar providing an equivalent sweetness. Alternatively, the sweetening composition may be prepared in a tablet form.

The sweetening properties of protein sweeteners such as thaumatin and monellin are liable to be affected by heat. Some preparations of thaumatin and monellin suffer some loss of sweetness on heating to temperatures above 70° for prolonged periods. When the composition of the invention is incorporated into a food or beverage whose preparation involves heating, it is desirable to add it after heating is complete so as to avoid loss of sweetness.

The composition of the invention is usually stable at pH values in the range of from 2 to 10, especially 2 to 4.

A dry powder or tablet containing a protein sweetener is stable indefinitely when stored under dry conditions at room temperature. An aqueous solution is stable indefinitely when frozen. However, if a preservative such as benzoic acid or its salts, sulphur dioxide or sodium metabisulphite is added to such a composition, it may be stored almost indefinitely at room temperature. The composition therefore has a long shelf life when incorporated into soft drinks or fruit juices or similar food compositions containing preservatives.

It has been found that when the compositions containing arabinogalactan are incorporated into food products or beverages, the final concentration of the arabinogalactan should be within the range of 0.1–2.5%, preferably 0.2–1.0%. Within this range, the lingering sweetness has an acceptable short duration, and the arabinogalactan neither detracts from the sweetness level nor imparts any "body" or "mouth feel" to the food or beverage. For sweeter compositions intended to be added to the food or beverage, the arabinogalactan concentration is, of course, higher since the composition will only be a fraction of the final product; the ratios set out before are appropriate provided that when added to the food or beverage, the final concentration is as just stated.

The sugar-like quality of saccharin-containing compositions may be enhanced by adding other components to the composition, in particular sodium chloride, e.g. in a weight ratio to saccharin of from 1:10 to 4:10, and/or an alkali metal or alkaline earth metal hydroxide, especially calcium hydroxide, e.g. in a weight ratio to saccharin of from 1:100 to 5:100.

The sweetening compositions of the present invention are much sweeter than sugar, have practically no calorific value compared with the equivalent sweetness of sugar and are cheaper to produce than sugar, so that they need not be expensive. They have a better sweetness and taste than saccharin alone and do not impair the flavor of edible materials in which they are incorporated. In some cases, where a protein sweetener is included, the compositions can produce a slightly sustained sweetness sensation which is pleasant and is sometimes preferable to that of sucrose, where there is no such sustained sweetness.

The sweetness of the compositions according to the present invention was assessed by a panel of experienced tasters against sucrose as a standard. The sweetness of the individual ingredients was also evaluated. Each material was dissolved in water at a neutral pH value to give a range of solutions each of a different concentration and the panel was asked to match the sweetness of the resulting solutions to that of a standard sugar solution.

Arabinogalactan was found to have no detectable sweetness but only a typical "gum-like" taste. The panel was asked to compare the sweetness of a range of sodium saccharin solutions of different concentrations with that of 2% and 5% solutions of sucrose. They assessed the sweetness of sodium saccharin as 510 times that of sucrose when the 2 sucrose solution was used as standard and 410 times that of sucrose when the 5% sucrose solution was used as standard. This result is in accordance with the known decrease in the relative sweetness of saccharin and other sweeteners such as xylitol with increasing concentration (e.g. Schutz and Pilgrim, Food Research, March–April 1957, "Sweetness of various compounds and its measurement").

The thaumatin used also showed a decrease in relative sweetness with increasing concentration, although the decrease was not as pronounced as that of saccharin. When solutions of thaumatin were assessed against a 5% solution of sucrose, the panel assessed the sweetness of thaumatin as 3,500 times that of sucrose. When the solutions were assessed against a 15% solution of sucrose, the panel assessed the sweetness of thaumatin at 1,800 times that of sucrose.

When a composition containing saccharin and thaumatin is dissolved in water, the apparent sweetness of the solution is often different to that which would be expected if the sweetness contribution of the saccharin and the thaumatin were additive. One possible reason for this apparent difference in sweetness is, as indicated above, that saccharin gives rise to an immediate sweetness of short duration, whereas thaumatin gives rise to a delayed and lingering sweetness. The maximum sweetness sensation of the two substances is perceived at different times so that the combined sweetness appears to be different to the sum of the sweetnesses of the individual substances.

The duration of the sweetness sensation is not usually significant when the relative sweetness of sucrose and artificial sweeteners, e.g. saccharin, or cyclamates are compared because the sensation of sweetness is usually of very short duration. However, we have found that duration is important in evaluating the sweetness of protein sweeteners such as thaumatin and monellin, where the lingering sweetness is significant. It is difficult to determine the precise relationship of the time of maximum perceived sweetness and the duration of the perceived sweetness.

The following Examples illustrate particular compositions according to the invention and their evaluation.

EXAMPLES 1 AND 2

Sweetening compositions suitable for incorporation into low-calorie foods and drinks were prepared by mixing together thaumatin with and without saccharin. In Example 1, two compositions were prepared, referred to as (a) and (b), the first containing no saccharin. In Example 2, a mixture of arabinogalactan and D-galactose was used.

The compositions are summarised in Table 1 below: all figures are parts by weight, but may also be read as g/liter for aqueous solutions.

TABLE 1

|  | Example | (a) | (b) |
|---|---|---|---|
| Thaumatin[1] |  | 0.02 | 0.01 |
| Saccharin[2] |  | — | 0.10 |
| Arabinogalactan[3] | 1 | 2.20 | 0.7 |
| D-galactose |  | — | 0.4 |
| + | 2 |  |  |
| Arabinogalactan |  | — | 0.2 |
| D-galactose |  | 2.80 | 0.8 |

1. The thaumatin preparation used was evaluated at a sweetness (measured in the absence of modifiers) of approximately 3,500×sucrose (measured against 5% sucrose). The amount of thaumatin used can be varied pro rata for weaker or stroger extracts.

2. Sodium saccharin was used; the free acid or other salts may be substituted.

3. Calbiochem 'A' grade (98% arabinogalactan, dry basis) Arabinose: galactose (1:6)

Both Examples gave solutions of approximately equal sweetness.

Example 2 shows the particular advantage to be gained by mixing two modifiers, namely arabinogalactan and D-galactose. The use of 0.6 parts of the mixture (0.4 D-galactose+0.2 arabinogalactan) is equivalent to the use of 0.7 parts of arabinogalactan or 0.8 parts of D-galactose alone.

Using food grade arabinogalactan (e.g. "STRactan 2" of St. Regis Paper Co., Taconia, Washington U.S.A.), it was found that a reduction of about 10% in the arabinogalactan content gave similar results.

EXAMPLE 3

A composition similar to that of Example 1(b) was prepared except that the saccharin content was replaced by an equivalent amount (35 parts) of sucrose.

These results may be taken to indicate that when thaumatin contributes more than 50% of the sweetness of the composition, saccharin may be wholly or partly replaced by sugar. Essentially the same taste response was found with the composition of Example 3 as with the composition of Example 1(b).

The composition of Examples 1 to 3 may be used in soft drinks or other food compositions.

EXAMPLE 4

Arabinogalactan (1.0 part by weight) was added to a mixture of monellin (0.04 part by weight) and saccharin (0.10 part by weight) to give a composition having sweetness characteristics similar to that of Example 1(b).

EXAMPLE 5

Arabinogalactan (1.0 part by weight) was added to a mixture of thaumatin (0.01 part by weight) and Na cyclamate (1.4 parts by weight) to give a comparison having sweetness characteristics similar to that of Example 1(b).

EXAMPLE 6

A bulked sweetener possessing the same sweetness as an equivalent volume of sugar is prepared by mixing the following ingredients and spray-drying to a bulk density of 0.2 g/cc:
malto-dextrin solution containing dry weight—222.2 g
sodium saccharin—5.1 g
arabinogalactan—1.7 g The resulting composition has a sweetening power equivalent to approximately 2 kilograms of sugar.

EXAMPLE 7

Granular sweetener
sodium saccharin—100 g
arabinogalactan—30 g
sodium chloride—26.7 g
calcium hydroxide—2.3 g
sugar—3,000 g The above ingredients were uniformly mixed and wet granulated using about 1 to 2% of a 50% aqueous alcohol. After drying and sifting, there was obtained a granulate having a sweetening power equivalent to that of approximately 14 times its weight of sugar.

EXAMPLE 8

The following ingredients were uniformly mixed:
Sodium saccharin—100 g
arabinogalactan—33.3 g
sodium chloride—26.7 g
calcium hydroxide—2 g This mixture has a sweetening power approximately equal to that of 250 times its weight of sugar.

EXAMPLE 9

For a low calorie lemonade, a bottling syrup is made up with the following ingredients (g/liter except where otherwise stated):
thaumatin—0.07
saccharin—0.7
arabinogalactan—4.9
benzoic acid—800 ppm
acidity (% w/v calculated as citric acid based on the weight of syrup)—1.1%
essence of lemon—4.6

A 170 ml portion of the above bottling syrup is diluted to a volume of 1 liter with carbonated water to form a soft drink which is then bottled.

EXAMPLE 10

In order to demonstrate the effect of arabinogalactan on the length of perception of sweetness and on sweetness level, varying amounts were added to a solution of thaumatin (2 mg/100 ml) which had a sweetness equivalent to a 6.2% solution of sucrose. The results are shown in Table 2.

TABLE 2

| Arabinogalactan mg. | % | Ratio of Thaumatin: Arabino-galactan | Equivalent to % Sucrose Solution | Sweetness Perception, Seconds |
|---|---|---|---|---|
| 0 | 0 | 1:0 | 6.2 | 1140 |
| 40 | 0.04 | 1:20 | 6.2 | 930 |
| 80 | 0.08 | 1:40 | 6.2 | 720 |
| 120 | 0.12 | 1:60 | 6.2 | 510 |
| 160 | 0.16 | 1:80 | 6.2 | 270 |
| 200 | 0.20 | 1:100 | 6.2 | 63 |
| 280 | 0.28 | 1:140 | 6.2 | 58 |
| 360 | 0.36 | 1:180 | 6.2 | 53 |
| 440 | 0.44 | 1:220 | 6.2 | 49 |
| 520 | 0.52 | 1:260 | 6.2 | 47 |
| 600 | 0.60 | 1:300 | 6.2 | 39 |
| 700 | 0.70 | 1:350 | 6.2 | 36 |
| 800 | 0.80 | 1:400 | 6.2 | 29 |
| 900 | 0.90 | 1:450 | 6.2 | 20 |
| 1000 | 1.00 | 1:500 | 6.2 | 14.5 |
| 2500 | 2.50 | 1:1250 | 6.2 | 14 |
| 3000 | 3.00 | 1:1500 | 6.0 | 13.5 |
| 4000 | 4.00 | 1:2000 | 5.5 | 13 |
| 5000 | 5.00 | 1:2500 | 5.0 | 12 |
| 7500 | 7.50 | 1:3750 | 4.0 | 11 |
| 10,000 | 10.00 | 1:5000 | 3.0 | 9 |
| 15,000 | 15.00 | 1:7500 | 2.0 | 6.5 |
| 20,000 | 20.00 | 1:10000 | 1.0 | 3.5 |

The foregoing data demonstrates that arabinogalactan decreases the length of sweetness perception as the concentration thereof is increased, a very pronounced decrease being observed with an increase from 0.16% to 0.20%. At concentrations above 2.5%, however, the overall sweetness of the solution is also decreased. Thus, the solution containing 3% arabinogalactan was about 3.2% less sweet than the same composition containing 2.5% arabinogalactan, and the solution containing 5% was about 20% less sweet. In contrast, solutions containing 2.5% arabinogalactan or less had the same sweetness as the solution containing no arabinogalactan.

By an "ingestible product" there is meant one which is in the ordinary course of use is intended to be swallowed, for instance a foodstuff or beverage, or an orally administered pharmaceutical composition. By an "oral composition" there is meant one which in the ordinary course of use is not intended to be ingested as such, but is taken into the mouth for the treatment of the throat or buccal cavity, for instance a toothpaste, tooth powder, mouth wash, gargle, troche, dental lotion or chewing gum. The concentration of the arabinogalactan in ingestible products and oral compositions should be, as noted earlier from about 0.01 to 2.5%, preferably 0.02 to 1.0%. By a "sweetening composition" there is meant a composition which is not itself taken orally, either to be ingested or held in the mouth, but instead is intended to be added to ingestible products or oral compositions to render them sweet or to increase their sweetness. The concentration in sweetening compositions is typically about 0.7 to 20% since the amount will be reduced to the 0.01 to 2.5% range when the sweetening composition is added to the ingestible product or oral composition.

We claim:

1. A sweetening composition comprising at least one sweetener selected from the group consisting of the protein sweetener thaumatin, the protein sweetener monellin and saccharin together with a sweetener aftertaste reducing amount of arabinogalactan, the ratio of arabinogalactan to said sweetener being such that the concentration of arabinogalactan does not detract from sweetness level or impart body or mouth feel or exceed 2.5% of an ingestible product or oral composition when the composition is added to said ingestible product or oral composition in an amount effective to sweeten said ingestible product or oral composition, and in which when saccharin is present in the absence of said protein sweeteners the ratio of arabinogalactan to saccharin does not exceed 1:1.

2. A composition according to claim 1 in which the sweetener is at least one protein sweetener used in the absence of saccharin, and the weight ratio of arabinogalactan to protein sweetener is from about x:12 to about x:70 where x is the number of times sweeter the protein sweetener is as compared with sucrose as a concentration of 5% by weight.

3. A composition according to claim 2 in which the weight ratio of arabinogalactan to protein sweetener is about x:32.

4. A composition according to claim 1 in which the sweetener is saccharin used in the absence of a protein sweetener, and the weight ratio of arabinogalactan to saccharin is from about 1:5 to about 1:1.

5. A composition according to claim 4 in which the weight ratio of arabinogalactan to saccharin is about 1:3.

6. A composition according to claim 1 in which said sweetener is a protein sweetener and further containing a sweetener selected from the group consisting of saccharin, a cyclamate and a sugar sweetener.

7. A composition according to claim 6 in which the sugar sweetener is selected from the group consisting of sucrose, glucose, or fructose.

8. A composition according to claim 1 further comprising a sweetness modifier selected from the group consisting of xylitol, D-arabitol, D-galactose, L-gulose, D-fucose, lactulose, glucoheptose, and D(+)-galactosamine.

9. A composition according to claim 8 comprising thaumatin, D-galactose and arabinogalactan.

10. A composition according to claim 1 comprising a solid or liquid non-toxic carrier or diluent.

11. A composition according to claim 10 comprising a carrier or diluent selected from the group consisting of a maltodextrin, starch, a nutritive protein, sucrose, ethanol, glycerol and an edible oil.

12. A composition according to claim 1 in which said sweetener is saccharin together with an additive selected from the group consisting of sodium chloride, an alkali metal hydroxide and an alkaline earth metal hydroxide.

13. A composition according to claim 12 comprising saccharin and sodium chloride in a weight ratio of from about 1:10 to about 4:10.

14. A composition according to claim 12 comprising saccharin and calcium hydroxide in a weight ratio of from about 1:100 to about 5:100.

15. An ingestible product or oral composition comprising a sweetening amount of the sweetening composition of claim 1 wherein the amount of arabinogalactan does not detract from sweetness level or impart body or mouth feel thereto or exceed 2.5% of said product or composition.

16. The ingestible product or oral composition of claim 15 wherein the amount of arabinogalactan is about 0.2 to 1.0%.

17. The ingestible product or oral composition of claim 15 in which the sweetener is a protein sweetener used in the absence of saccharin, and the weight ratio of arabinogalactan to protein sweetener is from about x:12 to about x:70 where x is the number of times sweetener the protein sweetener is as compared with sucrose as a concentration of 5% by weight.

18. The ingestible product or oral composition of claim 17 in which the weight ratio of arabinogalactan to protein sweetener is about x:32.

19. The ingestible product or oral composition of claim 15 in which the sweetener saccharin used in the absence of a protein sweetener, and the weight ratio of arabinogalactan to saccharin is from about 1:5 to about 1:1.

20. The ingestible product or oral composition of claim 15 in which the sweetener is a protein sweetener and further containing a sweetener selected from the group consisting of saccharin, a cyclamate and a sugar sweetener.

21. A method or reducing sweetener aftertaste in an ingestible product or oral composition containing a sweetener which is at least one member of the group consisting of the protein sweetener thaumatin, the protein sweetener monellin and saccharin which comprises adding to said ingestible product or oral composition an amount in the range of 0.04%–2.5% of arabinogalactan which does not detract from the sweetness level of or impart body or mouth feel to said product or composition and in which when saccharin is present in the absence of said protein sweeteners, the ratio of arabinogalactan to saccharin does not exceed 1:1.

22. The method of claim 21 wherein the amount of arabinogalactan is about 0.2 to 1.0%.

* * * * *